US011392107B2

(12) United States Patent
Schneider

(10) Patent No.: US 11,392,107 B2
(45) Date of Patent: Jul. 19, 2022

(54) TIME-OPTIMIZED MOVEMENT GUIDANCE BETWEEN TRACK SECTIONS

(71) Applicant: Siemens Aktiengesellschaft, Munich (DE)

(72) Inventor: Rene Schneider, Oederan (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/275,623

(22) PCT Filed: Sep. 5, 2019

(86) PCT No.: PCT/EP2019/073717
§ 371 (c)(1),
(2) Date: Mar. 11, 2021

(87) PCT Pub. No.: WO2020/053065
PCT Pub. Date: Mar. 19, 2020

(65) Prior Publication Data
US 2021/0356938 A1  Nov. 18, 2021

(30) Foreign Application Priority Data

Sep. 12, 2018 (EP) .................................... 18194060

(51) Int. Cl.
*G05B 19/416* (2006.01)
*G05B 19/402* (2006.01)

(52) U.S. Cl.
CPC ......... *G05B 19/416* (2013.01); *G05B 19/402* (2013.01); *G05B 2219/32015* (2013.01);
(Continued)

(58) Field of Classification Search
CPC ................ G05B 19/416; G05B 19/402; G05B 2219/32015; G05B 2219/32105;
(Continued)

(56) References Cited

U.S. PATENT DOCUMENTS

| 4,926,455 A | * | 5/1990 | Stojkov | ................ | G03B 42/025 |
| | | | | | 378/167 |
| 2002/0074964 A1 | * | 6/2002 | Quaschner | ........... | G05B 19/404 |
| | | | | | 318/560 |

(Continued)

FOREIGN PATENT DOCUMENTS

| CN | 101116043 A | 1/2008 |
| CN | 101128828 A | 2/2008 |

(Continued)

OTHER PUBLICATIONS

Haschke Robert et al: "On-Line Planning of Time Optimal, Jerk-Limited Trajectories", Universität Bielefeld (Preprint), Int. Conf. on Intelligent Robots and Systems, XP002789776, found in the Internet: URL: https://ni.www.techfak.uni-bielefeld.de/files/HaschkeWeitnauerRitter08-0PT.pdf; the whole document; 2008.

(Continued)

*Primary Examiner* — Thomas C Lee
*Assistant Examiner* — Michael Tang
(74) *Attorney, Agent, or Firm* — Henry M. Feiereisen LLC

(57) ABSTRACT

Machine elements can be displaced along disjoined path sections by position-controlled machine axes. Movement guidance of the machine elements from the end of a path section to the beginning of a directly following path section along a previously unknown path is provided, wherein location, velocity and acceleration are continuous along the previously unknown path and at the transitions between the path sections and the previously unknown path. Velocity, (Continued)

acceleration and jerk are limited. A preliminary axis guidance and a corresponding required axis time is determined for each of the axes. A greatest required axis time is determined therefrom which is then set as a final axis guidance for this axis. For other axes whose preliminary axis times are smaller than the greatest required axis time, the respective preliminary axis guidance is matched to the greatest required axis time, which is then adopted for the other axes as final axis guidance.

10 Claims, 6 Drawing Sheets

(52) U.S. Cl.
CPC .............. *G05B 2219/32105* (2013.01); *G05B 2219/34015* (2013.01); *G05B 2219/34175* (2013.01); *G05B 2219/35121* (2013.01)

(58) Field of Classification Search
CPC ........... G05B 2219/34015; G05B 2219/34175; G05B 2219/35121
See application file for complete search history.

(56) References Cited

U.S. PATENT DOCUMENTS

| | | | |
|---|---|---|---|
| 2002/0188356 A1 | 12/2002 | Paroz | |
| 2008/0188953 A1* | 8/2008 | Korajda | G05B 19/416 700/3 |
| 2009/0102411 A1 | 4/2009 | Miller et al. | |
| 2009/0125146 A1 | 5/2009 | Zhang et al. | |
| 2009/0295323 A1 | 12/2009 | Papiernik et al. | |
| 2013/0307459 A1* | 11/2013 | Tian | G05B 19/416 318/570 |
| 2016/0031083 A1* | 2/2016 | Embon | B25J 9/1676 700/255 |
| 2016/0274566 A1 | 9/2016 | Brambs et al. | |
| 2019/0160674 A1* | 5/2019 | Feng | B25J 9/1664 |

FOREIGN PATENT DOCUMENTS

| | | | |
|---|---|---|---|
| CN | 101290515 A | | 10/2008 |
| CN | 101939711 A | | 1/2011 |
| CN | 103853043 A | * | 6/2014 |
| CN | 106695787 A | * | 5/2017 |
| DE | 102009024130 A1 | | 12/2010 |
| DE | 102010013525 A1 | | 12/2010 |
| DE | 102010025271 A1 | | 12/2011 |
| WO | WO 2008125656 A1 | | 10/2008 |

OTHER PUBLICATIONS

PCT International Search Report and Written Opinion of International Searching Authority dated Feb. 7, 2020 corresponding to PCT International Application No. PCT/EP20109/073717 filed Sep. 5, 2019.

* cited by examiner

TIME-OPTIMIZED MOVEMENT GUIDANCE BETWEEN TRACK SECTIONS

CROSS-REFERENCES TO RELATED APPLICATIONS

This application is the U.S. National Stage of International Application No. PCT/EP2019/073717, filed Sep. 5, 2019, which designated the United States and has been published as International Publication No. WO 2020/053065 A1 and which claims the priority of European Patent Application, Serial No. 18194060.2, filed Sep. 12, 2018, pursuant to 35 U.S.C. 119(a)-(d).

BACKGROUND OF THE INVENTION

The present invention is based on an operating method for a machine which has a plurality of position-controlled axes, which cause, in their entirety, a displacement movement of a first element of the machine relative to a second element of the machine,
wherein the control facility controls the axes of the machine such that the first element of the machine traverses relative to the second element of the machine a plurality of predetermined path sections sequentially one after another, each with a velocity profile defined for the respective path section and an acceleration profile defined for the respective path section by the respective velocity profile,
wherein the path sections each have a beginning and an end and the end of each path section and the beginning of the directly subsequent path section differ in the position of at least one of the position-controlled axes.

The present invention is further based on a control program for a control facility, wherein the control program has machine code that is executable by the control facility, wherein the execution of the machine code by the control facility causes the control facility to operate a machine which has a plurality of position-controlled axes which cause, in their entirety, a displacement movement of a first element of the machine relative to a second element of the machine, according to an operating method of this type.

The present invention Is further based on a control program for a machine which has a plurality of position-controlled axes which cause, in their entirety, a displacement movement of a first element of the machine relative to a second element of the machine, wherein the control facility is programmed with a control program of this type so that the control facility controls the machine according to an operating method of this type.

The present invention is further based on a machine which has a plurality of position-controlled axes which cause, in their entirety, a displacement movement of a first element of the machine relative to a second element of the machine, wherein the machine has a control facility of this type which controls the axes of the machine according to an operating method of this type.

In machine tools and other production machines, alongside the so-called productive route sections in which the machine performs its actual technological task—for example, the tool carries out a machining operation relative to a workpiece—other non-productive route sections also exist. Such route sections are, for example, in the case of a machine tool, approach movements, withdrawal movements and transfer movements between productive route sections, tool changes, workpiece changes, calibration movements and others. Since the time taken for such movements is not productive, such times should be kept as short as possible, that is, time-optimal.

From the article "On-Line Planning of Time-Optimal, Jerk-Limited Trajectories" by Robert Haschke et al., retrieved on Aug. 17, 2018 from https://ni.www.techfak.uni-bielefeld.de/files/HaschkeWeitnauerRitter08-OPT.pdf, it is known to determine a time-optimal, jerk-limited movement online. The start conditions of the movement can be specified with regard to location, velocity and acceleration. At the end of the calculated movement, however, both the acceleration and also the velocity must have the value 0. The procedure described in the article is therefore unsuitable, in sequences of successive path sections, each of which is to be traversed with a velocity profile defined for the respective path section and an acceleration profile defined for the path section by the velocity profile, for determining a time-optimal solution of this type.

From DE 10 2010 013 525 A1, it is known to transfer a workpiece rotationally and/or linearly from a first resting position into a second resting position. In the context of this procedure, the movement takes place in a plurality of sections, the sections each being formed as polynomials of relatively high degree with respect to time, and the sections adjoin one another continuously and with multiple differentiability with respect to time. Both at the beginning and also at the end of each displacement movement, at least the velocity and the acceleration have the value 0.

From DE 10 2009 024 130 A1, it is known to move a first element of a machine relative to the second element of the machine from a beginning point to the end point along a specified path and, for travel along this path, to determine a movement guidance so that this path is time-optimal, continuous in location, velocity and acceleration and is traversed such that it is limited in velocity, acceleration and jerk. The velocities at the beginning point and at the end point can be specified. The accelerations at both these points are 0.

The object of the present invention consists in creating possibilities by means of which the efficiency of the operation of a machine of the type mentioned in the introduction can be maximized.

SUMMARY OF THE INVENTION

The object is achieved with an operating method as set forth hereinafter. Advantageous embodiments of the operating method are the subject matter of dependent claims.

According to the invention, an operating method of the type mentioned in the introduction is configured in that, for a movement guidance from the end of a respective path section to the beginning of the respective directly subsequent path section, initially only the end of the respective path section and the beginning of the respective directly subsequent path section, but not a path to be traversed from the end of a respective path section to the beginning of the respective directly subsequent path section are known to the control facility, in that the control facility determines for the axes a respective final axis guidance, in that the entirety of the final axis guidances corresponds to the movement guidance and in that the final axis guidances are coordinated with one another such that the movement of the first element of the machine relative to the second element of the machine within the determined movement guidance is time-optimal, continuous in location, velocity and acceleration and is limited in velocity, acceleration and jerk, at the end of the respective path section, transitions continuously in location, velocity and acceleration into the determined movement guidance and the determined movement guidance at the beginning of the respective directly subsequent path section transitions continuously in location, velocity and acceleration into the respective directly subsequent path section.

The control facility therefore determines a respective axis guidance for the individual axes of the machine, the axis guidances corresponding, in their entirety, to the movement guidance.

Since the number of axes is greater than 1, the axis guidances must be coordinated so that the axes each require the same length of time for their respective axis guidance. This can be ensured, for example, in that the control facility, for determining the movement guidance

- initially determines, for the axes independently of one another, a respective preliminary axis guidance that is time-optimal and continuous in location, velocity and acceleration and is limited in velocity, acceleration and jerk, from the end of a respective path section to the beginning of the respective directly subsequent path section, so that—relative to the respectively considered axis—the movement of the first element of the machine relative to the second element of the machine at the end of the respective path section transitions continuously in location, velocity and acceleration into the determined preliminary axis guidance and the determined preliminary axis guidance at the beginning of the respective directly subsequent path section transitions continuously in location, velocity and acceleration into the respective directly subsequent path section,
- determines for the axes the axis time required for the respective preliminary axis guidance,
- adopts the preliminary axis guidance with the greatest required axis time unchanged as the final axis guidance for this axis,
- modifies, for the axes with an axis time smaller than the greatest required axis time, the respective preliminary axis guidance, so that the continuity in location, velocity and acceleration is retained and the associated axis time matches the greatest required axis time, and adopts the thus determined modified axis guidances as final axis guidances.

For modifying the respective preliminary axis guidance, the control facility can, for example, reduce the value of the target velocity and, on the basis of the correspondingly quantitatively reduced target velocity, determine the respective preliminary axis guidance anew and determine the associated axis time until the associated axis time matches the greatest required axis time. This procedure is particularly reliable and relatively simple.

In order to be able to determine the respective preliminary axis guidance in a simple, reliable and also rapid manner, it is provided

- that for determining the respective preliminary axis guidance, the control facility subdivides the respective preliminary axis guidance into seven directly successive phases, wherein
    - each of the successive phases has a respective at least non-negative duration,
    - in the first phase and in the seventh phase, the jerk is positive or negative, but quantitatively is at a maximum,
    - in the third phase, the jerk is the inverse of the jerk in the first phase and in the fifth phase, the jerk is the inverse of the jerk in the seventh phase,
    - in the second and sixth phase, the jerk is 0,
    - in the fourth phase, the jerk and the acceleration are 0, and
    - the velocity in the fourth phase is the target velocity,
- in that the control facility sets the target velocity, successively, initially with positive and negative signs, to the maximum permissible value,
- in that, for the respective value of the target velocity, the control facility
    - determines the associated sections of the respective preliminary axis guidance for the first, second and third phase, so that at the end of the third phase, the acceleration is 0 and the velocity is equal to the respective target velocity,
    - determines the associated sections of the respective preliminary axis guidance for the fifth, sixth and seventh phase, so that at the beginning of the fifth phase, the acceleration is 0 and the velocity is equal to the respective target velocity,
    - tests whether, in view of the determined first to third phase and the determined fifth to seventh phase, a theoretical duration of the fourth phase is greater than or equal to 0,
    - if so, adopts the sections of the respective preliminary axis guidance for the first to third and fifth to seventh phase and, for the fourth phase, adopts the determined theoretical duration as the duration,
    - if not so, sets the duration of the fourth phase to 0 so that, as a result, the third phase and the fifth phase directly adjoin one another, and furthermore the control facility reduces the value of the target velocity and repeats the determination of the respective preliminary axis guidance for the first, second and third phase and for the fifth, sixth and seventh phase with the correspondingly modified value of the target velocity until either the third and the fifth phase continuously transition in location, velocity and acceleration into one another or the control facility determines that for the respective sign of the target velocity, a preliminary axis guidance is not determinable.

Typically, a preliminary axis guidance does not need to be determined for one of the two signs of velocity in the fourth phase. For at least one of the two signs, however, the preliminary axis guidance is determinable. If a preliminary axis guidance can be determined only for one of the two signs, then this axis guidance is the time-optimal preliminary axis guidance being sought. If, exceptionally, a preliminary axis guidance can be determined for both signs, then for these two axis guidances the time required for each is determined and as a result the preliminary axis guidance which requires the shorter time is used.

In many cases, a permissible region in the space defined by the possible movement ranges of the axes, within which the movement guidance determined by the control facility must take place is known to the control facility. If this is the case, the control facility preferably proceeds in such a way that

- it tests whether a movement guidance based exclusively upon the end of a respective path section and the beginning of the respective directly subsequent path section would take place within the permissible region,
- if so, it determines the movement guidance as described above, and
- if not so, it subdivides the movement guidance by specifying intermediate points to be approached into a plurality of directly successive submovements that are continuous in location, velocity and acceleration and limited in velocity, acceleration and jerk, and it determines the submovements just like a respective movement guidance in the context of the invention from the beginning of the respective subregion to the end of the respective subregion.

By this means, it is also possible to take into account a permissible region, for example, to prevent collisions.

In an individual case, it is possible that the submovements which adjoin neither the end of the respective path section nor the beginning of the respective subsequent path section have a velocity and an acceleration of 0 at the beginning and/or at the end of the respective submovement. Preferably, however, in at least one of the submovements, at least one of the axes has both at the beginning and also at the end of this submovement a velocity differing from 0 and/or an acceleration differing from 0. Thereby, the time required in total for performing all the submovements can be reduced.

It is possible that the beginnings and the ends of the path sections are specified to the control facility as such. This can be useful, in particular, within a machining movement. Alternatively, it is possible that the control facility determines the beginnings and/or ends of the path sections independently. For example, the control facility can recognize when it is to restart a machining operation after a tool change. Such a movement can always be realized as a movement guidance within the context of the invention. Mixed forms are also conceivable, such that although a part of the beginnings and ends is specified to the control facility, the control facility automatically determines another part of the beginnings and/or ends.

The operating method according to the invention results in a rapid determination of the movement guidance. It is thereby possible that the control facility carries out the operating method online.

The object is further achieved with a control program as set forth hereinafter. According to the invention, a control program of the type mentioned in the introduction is configured such that the execution of the machine code by the control facility causes the control facility to control a machine which has a plurality of position-controlled axes which cause, in their entirety, a displacement movement of a first element of the machine relative to a second element of the machine, in accordance with an operating method according to the invention.

The object is further achieved by means of a control facility for a machine as set forth hereinafter. According to the invention, a control facility of the type mentioned in the introduction is programmed with a control program according to the invention, so that the execution of the machine code causes the control facility to control the machine in accordance with an operating method according to the invention.

The object is further achieved by means of a machine as set forth hereinafter. According to the invention, with a machine of the type mentioned in the introduction, the control facility of the machine is configured according to the invention so that the control facility controls the axes of the machine in accordance with an operating method according to the invention.

BRIEF DESCRIPTION OF THE DRAWING

The above-described properties, features and advantages of this invention and the manner in which they are achieved are made more clearly and distinctly intelligible with the following description of the exemplary embodiments which are described in greater detail making reference to the drawings. In the drawings, in schematic representation.

DETAILED DESCRIPTION OF PREFERRED EMBODIMENTS

Figure 1:
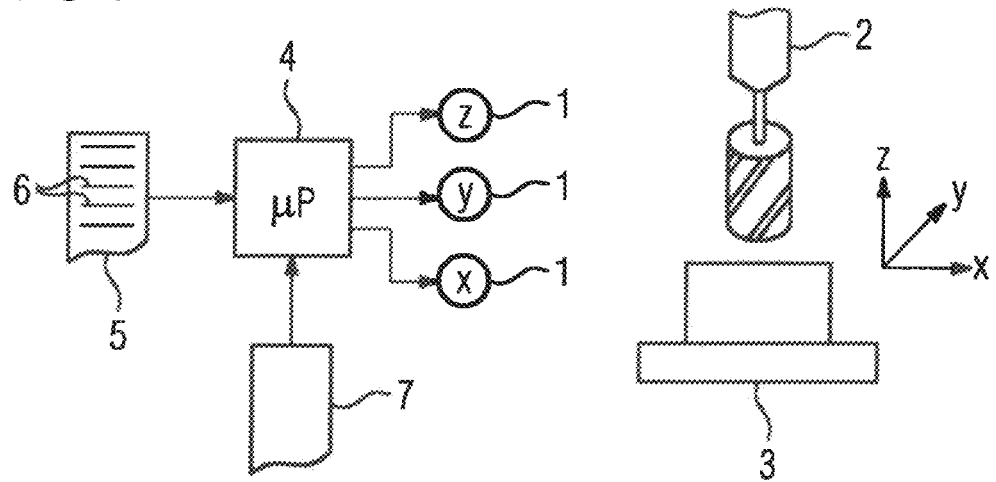
FIG. 1 shows a machine.

According to FIG. 1, a machine has a plurality of position-controlled axes 1. By means of the axes 1 in their entirety—assuming a corresponding control of the axes 1—a displacement movement of a first element 2 of the machine relative to a second element 3 of the machine is brought about. For example, a tool holder (=first element 2) of the machine can be moved relative to a workpiece holder 3 (=second element) of the machine so that a tool held in the tool holder changes a contour of a workpiece 4 held in the workpiece holder according to the displacement movement.

Three axes 1 by means of which a relative movement in three translational directions x, y, z is possible are shown in FIG. 1. However, this representation is purely exemplary. More or fewer axes 1 can also be present. Furthermore, displacement movements in rotational orientations are also possible, whether alternatively or additionally to a displacement movement in translational directions x, y, z.

In the example described above, the machine is a machine tool. However, this embodiment is purely exemplary. It can also be another machine, for example, a six-axis robot (the number of axes of the robot can also be larger or smaller) or another machine.

The machine further has a control facility 4. The control facility 4 controls the axes 1 of the machine. In the case of a machine tool, the control facility 4 is typically configured as a numerical control (CNC) system. In the case of a different machine, the control facility 4 is typically configured as a movement control system. In both cases, a clocked specification of position target values to the axes 1 takes place, for example, every 250 µs or every 125 µs. The directly successive position target values each have only a small offset relative to one another. As a result, it is brought about by means of the control of the axes 1 by the control facility 4 that the axes 1 cause a position-guided movement of the first element 2 relative to the second element 3. The first element 2 therefore moves relative to the second element 3 in respect of each axis 1 with a respective velocity and a respective acceleration, the respective velocity and the respective acceleration being determined by the sequence of position target values of the respective axis 1 or even being explicitly specified.

The control facility 4 is therefore programmed with a control program 5. The control program 5 comprises machine code 6 which can be executed by the control facility 4. The programming of the control facility 4 with the control program 5 causes the control facility 4 to execute the machine code 6 during operation. The execution of the machine code 6 causes the control facility 4 to control the machine according to an operating method which is described in greater detail below.

The control facility 4 controls the machine in real time. The control facility 4 therefore carries out the operating method online. "Online" means in this context that calculations and determinations of position target values and values derived therefrom which the control facility 4 carries out must be completed within a few milliseconds so that the position target values determined can be output to the axes 1 at the right time.

Figure 2:
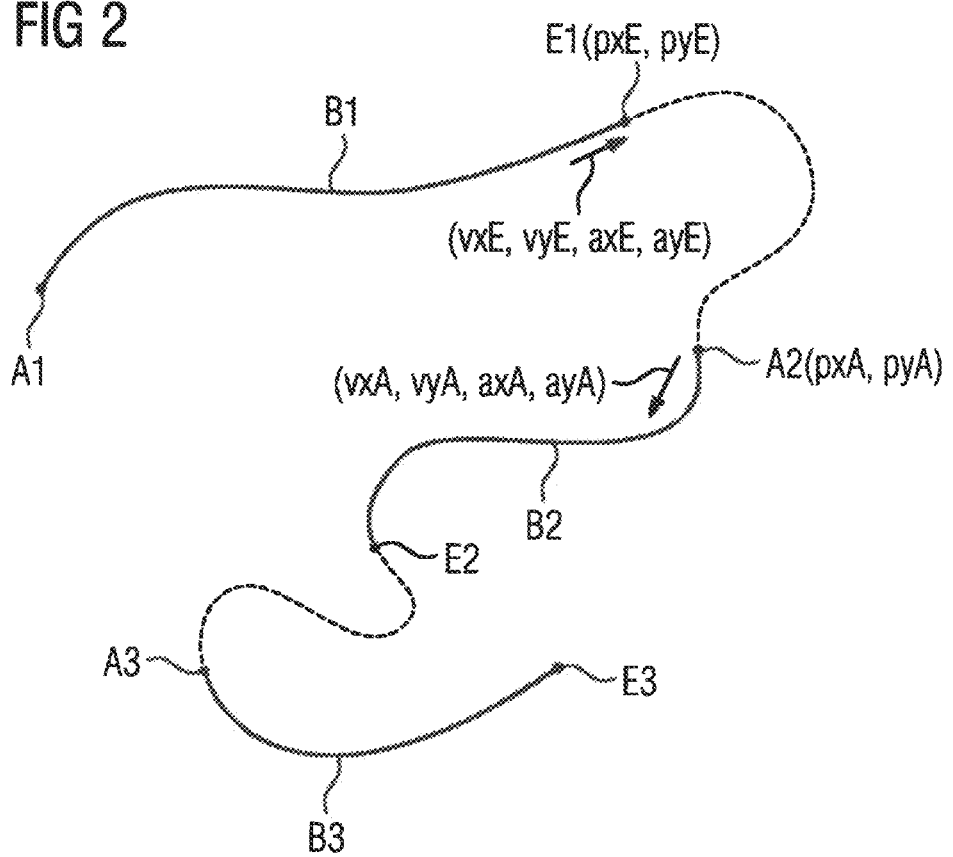
FIG. 2 shows possible path sections and movement guidances.

In the context of the execution of the machine code 6, the control facility 4 controls the axes 1 in such a way that the first element 2—see the representation in FIG. 2—sequentially traverses a plurality of pre-determined path sections B1 to B3, relative to the second element 3. The number of three path sections B1 to B3 shown in FIG. 2 is purely exemplary. Typically, the number of path sections B1 to B3 is significantly greater and lies in the region of several hundred or several thousand. The path sections B1 to B3 are typically determined by a utility program 7, for example, in the case of a machine tool, by a parts program.

The respective path section B1 to B3 is traversed with a defined velocity profile and a defined acceleration profile. Both the velocity and also the acceleration can vary within the respective path section B1 to B3 and also be different from one another from path section B1 to B3 to path section B1 to B3. Both the velocity and also the acceleration vary within the respective path section B1 to B3, though not abruptly, but only continuously. The path sections B1 to B3 are also per se smooth curves. The transition from path section B1 to B3 to path section B1 to B3 is however discontinuous. "Discontinuous" means herein that the path sections B1 to B3 each have a beginning A1 to A3 and an end E1 to E3 and that the end E1 to E3 of each path section B1 to B3 and the beginning A1 to A3 of the respective directly subsequent path section B1 to B3—for example, the end E1 of the path section B1 and the beginning A2 of the path section B2—differ in the position of at least one of the position-controlled axes 11.

The path sections B1 to B3 (including their sequence) and thus also the beginnings A1 to A3 and the ends E1 to E3 of the path sections B1 to B3 can also be specified as such to the control facility 4. The control facility 4 must accept the path sections B1 to B3 and also the assigned velocity profiles just as they are specified to it. The respective movement guidance for the transition from the end E1 to E3 of a path section B1 to B3 to the beginning A1 to A3 of the respective subsequent path section B1 to B3—shown dashed in FIG. 2—is however not specified to the control facility 4.

Alternatively, it is possible that the control facility 4 determines the beginnings A1 to A3 and/or ends E1 to E3 of the path sections B1 to B3 automatically. If, for example, in a subprogram of a machine tool, firstly a machining of the workpiece and then a tool change are to take place, the machining of the workpiece corresponds to a path section B1 to B3 and the location at which the tool used is to be deposited represents a target point that is to be approached. Other configurations in which an independent determination of the path sections B1 to B3 can take place are also conceivable. For example, on the basis of previous machining processes, it can be known to the control facility 4 at which sites the workpiece cannot be located so that at this region, a programmed displacement movement does not have to be exactly adhered to. In this case, the limits of the region in which the programmed displacement movement do not have to be adhered to can be regarded and determined by the control facility 4 as the end E1 to E3 of a path section B1 to B3 and the beginning A1 to A3 of the subsequent path section B1 to B3.

The determination of the movement guidance of the first element 2 relative to the second element 3 from the end E1 to E3 of a respective path section B1 to B3 to the beginning A1 to A3 of the respective subsequent path section B1 to B3 is the subject matter of the present invention.

The present invention will now be described in greater detail substantially in relation to a single axis 1. Reference signs used in relation to this axis 1 always contain the letter "x". This axis 1 is also assumed to be the translationally acting axis 1. However, in principle the same procedure is also possible in relation to a differently acting axis 1, in particular, in relation to a rotationally acting axis 1. Furthermore, in principle, the same procedure with regard to the respective other axes 1 is possible—again in relation to the respective other axis 1.

Insofar as the coordination of a plurality of axes 1 with one another is concerned, it is still only the coordination of just two axes 1 that will be described. It is herein assumed that the second axis 1 is also a translationally acting axis 1. The reference signs used in relation to this axis 1 always contain the letter "y". In the same way, however, more than two axes 1 can also be coordinated with one another, specifically independently of whether the axes 1 are translationally acting, rotationally acting or otherwise acting axes 1.

The present invention is further described for the transition from the end E1 of the path section B1 to the beginning A2 of the path section B2. However, a similar procedure is also possible for the transitions between other path sections B1 to B3, for example, from path section B2 to path section B3.

As mentioned above, the path sections B1 to B3 are traversed with a defined velocity profile and a defined acceleration profile. At the end E1 of the path section B1, the two axes 1 thus have the positions pxE and pyE, the velocities vxE and vyE and the accelerations axE and ayE, wherein all these values are determined by the path section B1. In a similar way, at the beginning of the path section B2, the two axes 1 have the positions pxA and pyA, the velocities vxA and vyA and the accelerations axA and ayA, wherein all these values are determined by the path section B2. The control facility 4 determines a movement guidance from the end E1 of the path section B1 to the beginning A2 of the path section B2. This movement guidance is the resultant path—determined by the control facility 4—along which the control facility 4 moves the first element 2 relative to the second element 3. This movement guidance is traversed with regard to each involved axis with a velocity profile determined by the control facility 4 and an acceleration profile that is also determined thereby.

The movement guidance is determined by the respective corresponding temporal course of the movement of the axes 1 involved. The respective temporal course of the involved axes 1 is denoted below as axis guidance. If the axis guidance is preliminary, it is given the reference sign AF below. If the axis guidance is final, it is given the reference sign AF' below. In the following, the determination of the preliminary axis guidance AF is described for the x-axis 1. The same procedure can also take place, as previously mentioned, for the other axes 1. The axis guidances AF determined in this way are therefore only preliminary since the preliminary axis guidances AF' must still be coordinated with one another. This will be made clear in the further description.

The movement guidance and thus also the preliminary axis guidances AF are limited in velocity v, acceleration a and jerk r. Thus, for each axis 1, the following relations apply $$-v\max \leq v \leq v\max, \quad (1)$$

$$-a\max \leq a \leq a\max \quad (2)$$

and $$-r\max \leq r \leq r\max. \quad (3)$$

where vmax, amax and rmax are the maximum possible values of the velocity v, the acceleration a and the jerk r of the respective axis 1.

Figure 3:
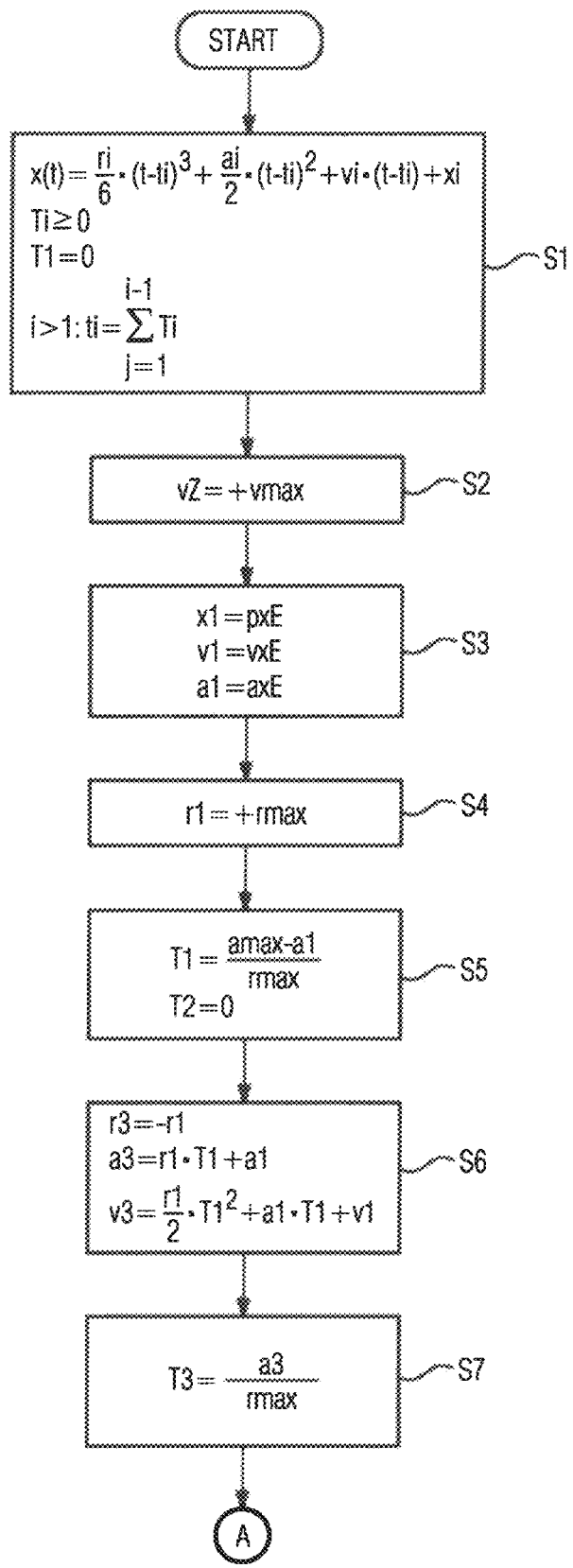
FIGS. 3 to 5 show a flow diagram for determining an axis guidance.
Figure 4:
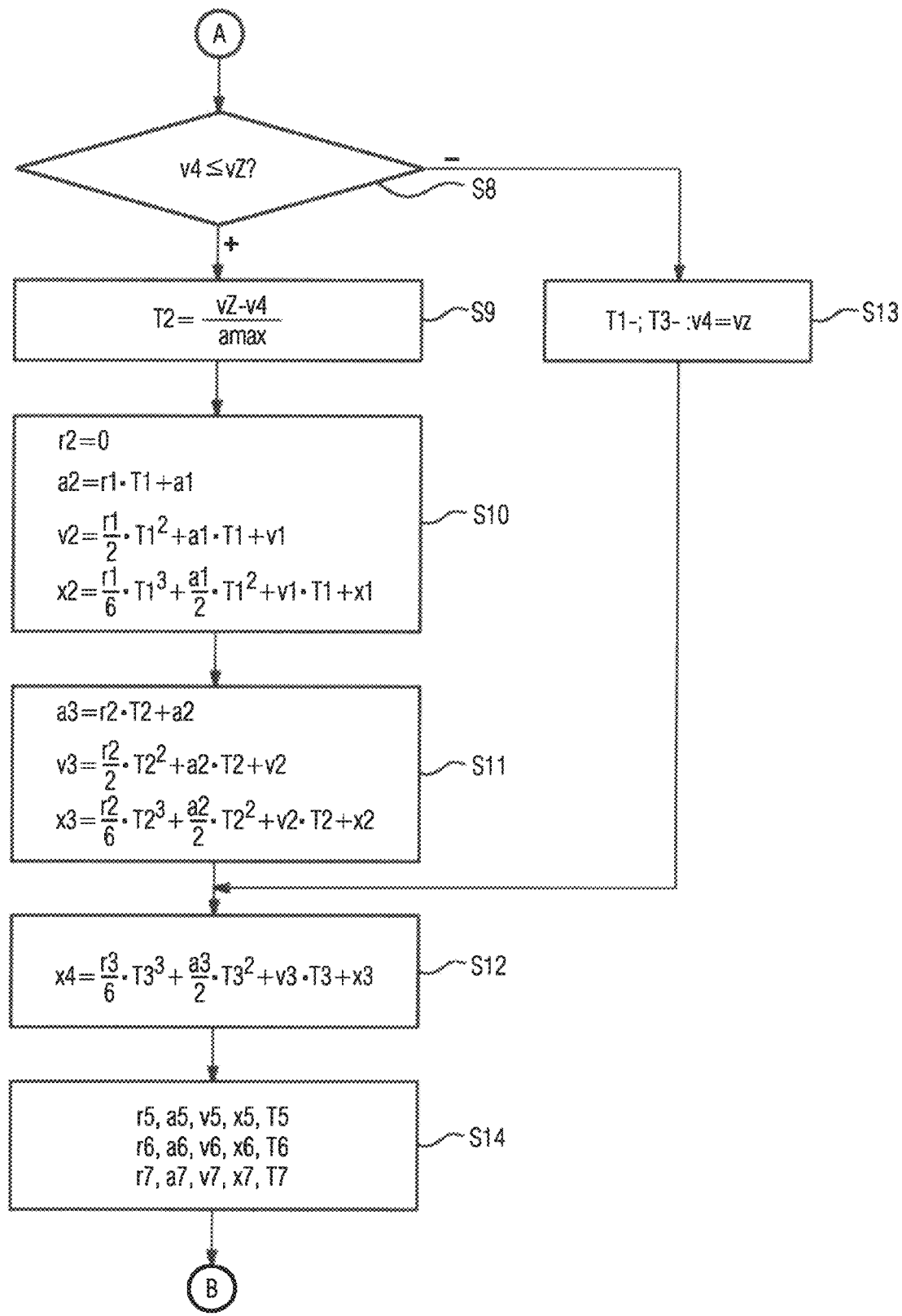
Figure 5:
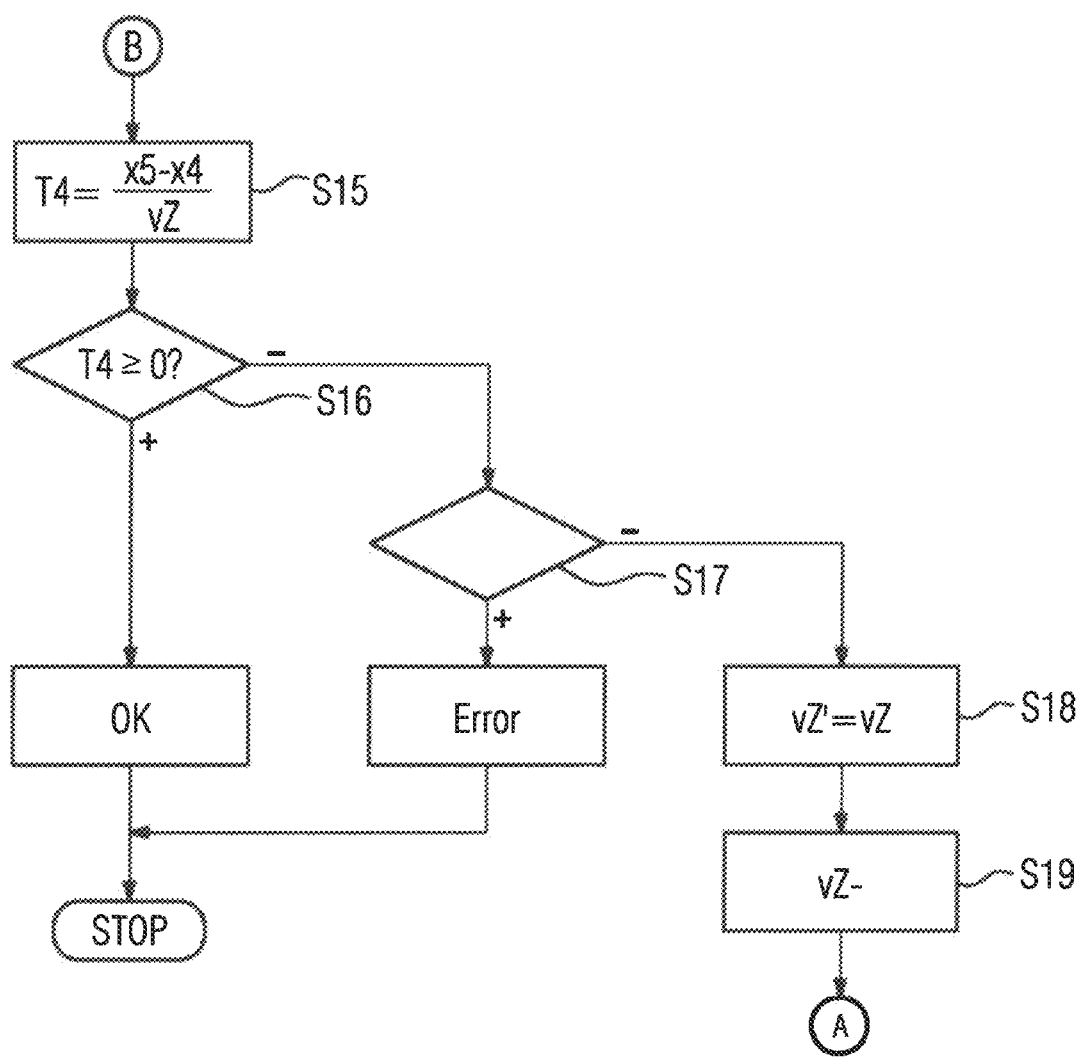

In order to determine the respective preliminary axis guidance AF, in step S1 according to FIG. 3 to 5 the control facility 4 subdivides the respective preliminary axis guidance AF into seven phases i (where i=1 ... 7). The phases follow directly one after the other according to their numbering. Each phase has a duration Ti. However, the durations Ti can in fact be 0. In this case, the respective phase degenerates so that the respective preceding phase (phase i−1) and the respective subsequent phase (phase i+1) directly adjoin one another. The durations Ti cannot be less than 0.

The jerk r is constant in every phase. The location x of the first element 2 relative to the second element 3 as a function of the time t can thus be described in each phase, i.e. for the duration Ti of the respective phase, by the movement equation $$x(t) = \frac{ri}{6} \cdot (t - ti)^3 + \frac{ai}{2} \cdot (t - ti)^2 + vi \cdot (t - ti) + xi \quad (4)$$

Here, ti is the time point at which the respective phase begins. ri, ai, vi and xi are the jerk r, the acceleration a, the velocity v and the location x at this time point ti.

From equation (4), the associated equations for the velocity v, the acceleration a and the jerk r can be derived as a function of time t:

$$v(t) = \frac{ri}{2} \cdot (t - ti)^2 + ai \cdot (t - ti) + vi, \quad (5)$$

$$a(t) = ri \cdot (t - ti) + ai \quad (6)$$

and $$r(t) = ri. \quad (7)$$

For phase 1, it can be assumed without limiting the generality that t1 has the value 0. For the other phases, in this case, evidently the following relationship applies $$ti = \sum_{j=1}^{i-1} Tj. \quad (8)$$

The jerk r in phases 2 and 6 is 0. For phases 2 and 6, equations 4 to 6 can thus be simplified to $$x(t) = \frac{ai}{2} \cdot (t - ti)^2 + vi \cdot (t - ti) + xi \quad (9)$$

$$v(t) = ai \cdot (t - ti) + vi \quad (10)$$

and $$a(t) = ai. \quad (11)$$

In phase 4, both the jerk r and also the acceleration a are indeed 0. For phase 4, equations 4 to 5 can thus be simplified to $$x(t) = vi \cdot (t - ti) + xi \quad (12)$$

and $$v(t) = vi. \quad (13)$$

The jerk r in phases 1, 3, 5 and 7 is quantitatively always a maximum. Furthermore, it is herein also the case that the jerk r in the third phase is the inverse of the jerk in the first phase and the jerk in the fifth phase is the inverse of the jerk in the seventh phase. The jerk r in phase 1 and the jerk r in phase 7 can be positive or negative as required and have the same or different signs.

The velocity v in the fourth phase is a target velocity vZ. The control facility 4 initially sets the target velocity vZ in step S2 to the value +vmax. Thereafter, in step S3, the control facility 4 determines the parameters for phase 1 with the exception of the jerk r1. These parameters are given by the values for the location x, the velocity v and the acceleration a at the end E1 of the path section B1 and are already final:

$$x1 = pxE, \quad (14)$$

$$v1 = vxE \quad (15)$$

and $$a1 = axE. \quad (16)$$

In addition, in step S4, the control facility 4 sets the jerk r1 for phase 1 to the positive maximum value +rmax. In step S5, the control facility 4 then determines, using the relation $$T1 = \frac{a\max - a1}{r\max} \quad (17)$$

the duration T1 for phase 1. This determination is only preliminary. Thus—even if only in a preliminary manner—all the parameters of the movement equation for phase 1 and also its duration T1 are known.

Then it is provisionally assumed that the duration T2 of phase 2 is 0, so that phase 3 directly adjoins phase 1. Due to the circumstance that the parameters and the duration T1 for phase 1 are assumed to be known, the control facility 4 can thus also determine in step S6—even if only in a preliminary manner—the parameters and the duration T3 for phase 3. In particular, the following applies $$r3 = -r1, \quad (18)$$

$$a3 = r1 \cdot T1 + a1, \quad (19)$$

$$v3 = \frac{r1}{2} \cdot T1^2 + a1 \cdot T1 + v1, \quad (20)$$

and $$x3 = \frac{r1}{6} \cdot T1^3 + \frac{a1}{2} \cdot T1^2 + v1 \cdot T1 + x1. \quad (21)$$

The (preliminary) duration of phase 3 is given by $$T3 = \frac{a3}{r\,\text{max}}. \quad (22)$$

Thus—even if only in a preliminary manner—all the parameters of the movement equation for phase 3 and also its duration T3 are known. Thus, the control facility 4 can determine in step S7 the velocity v at the end of phase 3:

$$v4 = \frac{r3}{2} \cdot T3^2 + a3 \cdot T3 + v3, \quad (23)$$

This is the (preliminary) velocity v at which—provided the calculation were final—the transition to phase 4 would take place.

In step S8, the control facility 4 now compares the velocity v4 with the target velocity vZ. If the velocity v4 is smaller than the target velocity vZ, in step S9, the control facility 4 compares the duration T2 of phase 2 as $$T2 = \frac{vZ - v4}{a\,\text{max}}. \quad (24)$$

Thereafter, in step S10, the control facility 4 determines the parameters for phase 2. In particular, the parameters are given by $$r2 = 0 \quad (25)$$

$$a2 = r1 \cdot T1 + a1 \quad (26)$$

$$v2 = \frac{r1}{2} \cdot T1^2 + a1 \cdot T1 + v1 \quad (27)$$

and $$x2 = \frac{r1}{6} \cdot T1^3 + \frac{a1}{2} \cdot T1^2 + v1 \cdot T1 + x1. \quad (28)$$

Since thereby, all the parameters including the duration T2 for phase 2 are specified, in step S11, the control facility 4 can determine the parameters for phase 3 anew:

$$a3 = r2 \cdot T2 + a2, \quad (29)$$

$$v3 = \frac{r2}{2} \cdot T2^2 + a2 \cdot T2 + v2 \quad (30)$$

and $$x3 = \frac{r2}{6} \cdot T2^3 + \frac{a2}{2} \cdot T2^2 + v2 \cdot T2 + x2. \quad (31)$$

The jerk r3 and the duration T3 of phase 3 remain unchanged. The control facility 4 is thus also able to determine in step S12 the location x of the beginning of phase 4:

$$x4 = \frac{r3}{6} \cdot T3^3 + \frac{a3}{2} \cdot T3^2 + v3 \cdot T3 + x3. \quad (32)$$

For the velocity in phase 4, the following relation applies $$v4 = vZ, \quad (33)$$

If, however, the control facility 4 recognizes in step S8 that the velocity v4 determined in step S7 is greater than the target velocity vZ, the control facility 4 retains the value 0 for the duration T2 of phase 2. Furthermore, in step S13, the control facility 4 reduces the durations T1 and T3 for phases 1 and 3 by the same amounts. The control facility 4 reduces the durations T1 and T3 far enough that during a determination similarly to steps S6 and S7, the velocity v4 determined now matches the target velocity vZ. During the reduction of the durations T1 and T3, the control facility 4 observes the condition that the durations T1 and T3 must not become negative. Then the control facility 4 transfers to step S12.

With the performance of steps S1 to S13, the control facility 4 has thus determined a preliminary axis guidance AF for the first, second and third phase, so that at the end of the third phase, the acceleration a is 0 and the velocity v is equal to the target velocity vZ. The location x reached at the end of the third phase is a theoretically achieved location x4.

In step S14, the control facility 4 then carries out a similar procedure for phases 5 to 7. The determination is entirely similar to steps S1 to S13. This can be imagined as meaning that the zero point of time t is placed at the end of phase 7 and that time t is allowed to run backwards. The control facility 4 thus determines a preliminary axis guidance AF for the fifth, sixth and seventh phase, so that at the beginning of the fifth phase, the acceleration a is 0 and the velocity v is equal to the target velocity vZ. The location x reached at the beginning of the fifth phase is a theoretically achieved location x5.

In step S15, the control facility 4 ascertains according to the relation $$T4 = \frac{x5 - x4}{vZ} \quad (34)$$

a theoretical duration T4 of phase 4. In step S16, the control facility 4 tests whether the duration T4 determined in step S15 is positive or at least is not negative. If the duration T4 is positive or is not negative, the determination of the corresponding preliminary axis guidance AF is completed. The hitherto preliminary values—where this relates to the determination of the corresponding preliminary axis guidance AF—have become final values.

If, however, the duration T4 determined in step S15 is negative, in step S17 the control facility tests whether a termination criterion has been fulfilled. If the termination criterion is fulfilled, the control facility 4 is not capable of determining a preliminary axis guidance AF for the respective sign of the target velocity vZ. The termination criterion can be fulfilled, for example, if the value of the target velocity vZ falls below a threshold value. The threshold value can be determined, for example, by the velocities vxE, vxA at the end E1 of the path section B1 and at the beginning A2 of the path section B2. Alternatively, the threshold value can have the value 0. If the termination criterion is not fulfilled, in step S18, the control facility 4 stores the target velocity vZ as the old target velocity vZ'. Then, the control facility 4 reduces the value of the target velocity vZ in step S19 while maintaining the sign and returns to step S8. As a result, the control facility 4 therefore establishes a new calculation of the preliminary axis guidance AF, although with the corresponding modified value of the target velocity vZ. This renewed calculation is further carried out under the boundary condition that the duration T4 of phase 4 must be 0.

As a consequence, the control facility 4 thus determines, by means of the procedure according to FIG. 3 to 5, the parameters and the durations T1 to T7 for the phases 1 to 7 of a time-optimized movement guidance for the axis 1 in question, that is, the respective preliminary axis guidance AF.

The procedure of FIG. 3 to 5 was described above in the context that, in step S2, the target velocity vZ is set with a positive sign to the maximum permissible value vmax and that the jerk r for phase 1 is also set with a positive sign to the maximum permissible value rmax in step S4. On the basis of the statement that in step S14 for phases 5 to 7, a similar procedure is used for phases 1 to 3, according to the procedure described above, the jerk r for phase 7 is again set with a positive sign to the maximum permissible value rmax. The procedure of FIG. 3 to 5 is, however, carried out with other combinations of the signs for the target velocity vZ and the jerk r in phase 1 and the jerk r in phase 7. At the least, the procedure is repeated in the combination that the target velocity vZ is set with a negative sign to the maximum permissible value vmax and that the jerk r for phase 1 is also set with a negative sign to the maximum permissible value rmax in step S4 and also the jerk r for phase 7 is set with a negative sign to the maximum permissible value rmax. Dependent upon the position of the individual case, it can be required to consider all eight combinations (velocity vZ positive or negative—jerk r in phase 1 positive or negative—jerk r in phase 7 positive or negative). Typically, for some of the combinations considered it is not possible to determine an axis guidance AF. In at least one of the combinations considered, however, this possibility does exist. Furthermore, provided that in phase 1 the jerk r is set with a negative sign to the maximum permissible value rmax, equation 17 is modified such that the maximum possible values amax and rmax for the acceleration a and the jerk r are provided with a negative sign. Equation 17 becomes changed thereby to $$T1 = \frac{a\max + a1}{r\max}. \tag{35}$$

If a plurality of possible axis guidances AF arise, then according to the relation $$TA = \sum_{i=1}^{7} Ti \tag{36}$$

the control facility 4 determines the respective axis time TA for all possible axis guidances AF. It then selects the possible axis guidance AF with the smallest axis time TA as a preliminary axis guidance AF for this axis 1. If only one single possible axis guidance AF results, for this axis 1 this possible axis guidance AF is naturally adopted. The associated axis time TA is given, as before, according to equation 36. The preliminary axis guidance AF determined—for the respective axis 1—is time-optimal, continuous in velocity v and acceleration a and is limited in velocity v, acceleration a and jerk r. It is also continuous in location x. This arises from the—obvious—condition that the movement guidance is determined from the end E1 of the path section B1 to the beginning A2 of the path section B2.

Figure 6:
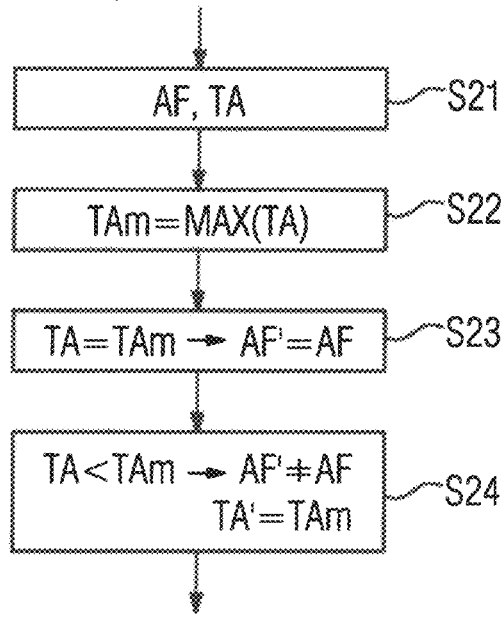
FIG. 6 shows a flow diagram for coordinating a plurality of axis guidances.

The procedure described above in relation to FIG. 3 to 5, that is, the determination and possible selection of the preliminary axis guidance AF, is carried out by the control facility 4, according to FIG. 6 in step S21 for each axis 1, specifically independently of the other axes 1. It thereby determines for all the axes 1 a (1) respective preliminary axis guidance AF and the respective associated axis time TA. However, the preliminary axis guidances AF are not yet coordinated with one another. In order to carry out this coordination, the control facility 4 determines in step S22 the maximum TAm of the axis times TA of the axes 1. Furthermore, in step S23, for those axes 1 the axis time TA of which matches the maximum TAm of the axis times TA, the control facility 4 adopts the respectively determined preliminary axis guidance AF unchanged as the final axis guidance AF'. Due to the unchanged adoption, the final axis time TA' for these axes 1 is unchanged, so equal to the maximum TAm.

In step S24, for the axes 1 the axis time TA of which is smaller than the maximum TAm of the axis times TA, the control facility 4 modifies the previously determined respective preliminary axis guidance AF. The modification will be described below in relation to FIG. 7. The modification is such that after completion of the modification, the modified axis time TA' is equal to the maximum TAm, although the continuity in location x, velocity v and acceleration a is retained.

Figure 7:
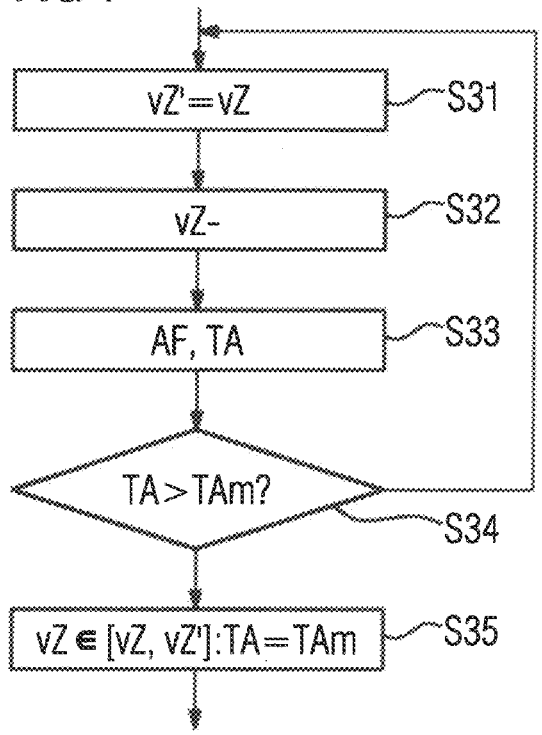
FIG. 7 shows a flow diagram for determining a modified axis guidance.

For the corresponding modification of step S24, the control facility 4 preferably initially stores the determined target velocity vZ of the axis 1 under consideration as the old target velocity vZ' in step S31 for the respective axis 1 according to FIG. 7. Then, in step S32, the control facility 4 reduces the value of the previously determined target velocity vZ for the axis 1 under consideration. With this quantitatively reduced target velocity vZ, in step S33, the control facility 4 determines anew the corresponding axis guidance AF and the associated axis time TA. The implementation of step S33 corresponds substantially to the procedure of FIG. 3 to 5 with the exception of the circumstance that the target velocity vZ is already specified, so that step S2 can be omitted. In step S34, the control facility 4 tests whether the axis time TA determined in step S33 is greater than the maximum TAm. If this is not the case, the control facility 4 returns to step S31 again. By this means, as a result, the target velocity vZ is always further reduced quantitatively until the modified axis time TA determined in step S33 is greater than the maximum TAm.

As soon as the modified axis time TA determined in step S33 is greater than the maximum TAm, two target velocities are known to the control facility 4, specifically the target velocities vZ and vZ', one of the associated axis times TA being greater and the other axis time TA being less than the maximum TAm. The control facility 4 can therefore determine without difficulty in step S35 a final target velocity vZ at which the associated axis time TA is equal to the maximum TAm. For example, the control facility 4 can determine iteratively in each case a target velocity vZ between the two last valid target velocities vZ, vZ' and for these target velocities vZ can determine the axis time TA anew until the resulting axis time TA is equal to the maximum TAm. The determination of the step S35 can take place, for example, by interval division or according to the secant process. Other procedures are also possible. In the context of step S35, at the same time, the determination of the corresponding preliminary axis guidance AF takes place anew. This is required because without the determination of the preliminary axis guidance AF, the axis time TA cannot be determined.

As a result, the control facility 4 is therefore capable of determining a movement guidance—specifically the entirety of the final axis guidance AF'—from the end E1 to E3 of a respective path section B1 to B3 to the beginning A1 to A3 of the respective directly subsequent path section B1 to B3, so that the movement of the first element 2 of the machine relative to the second element 3 of the machine at the end E1 to E3 of the respective path section B1 to B3 transitions continuously in location pxE, pyE, velocity vxE, vyE and acceleration axE, ayE into the determined movement guidance and furthermore, the movement guidance at the beginning A1 to A3 of the respective directly subsequent path section B1 to B3 transitions continuously in location pxA, pyA, velocity vxA, vyA and acceleration axA, ayA into the respective directly subsequent path section B1 to B3. In accordance with this movement guidance, the control facility 4 controls the axes 1 in order to guide the first element 2 of the machine relative to the second element 3 of the machine from the end E1 to E3 of a respective path section B1 to B3 to the beginning A1 to A3 of the respective directly subsequent path section B1 to B3.

Figure 8:
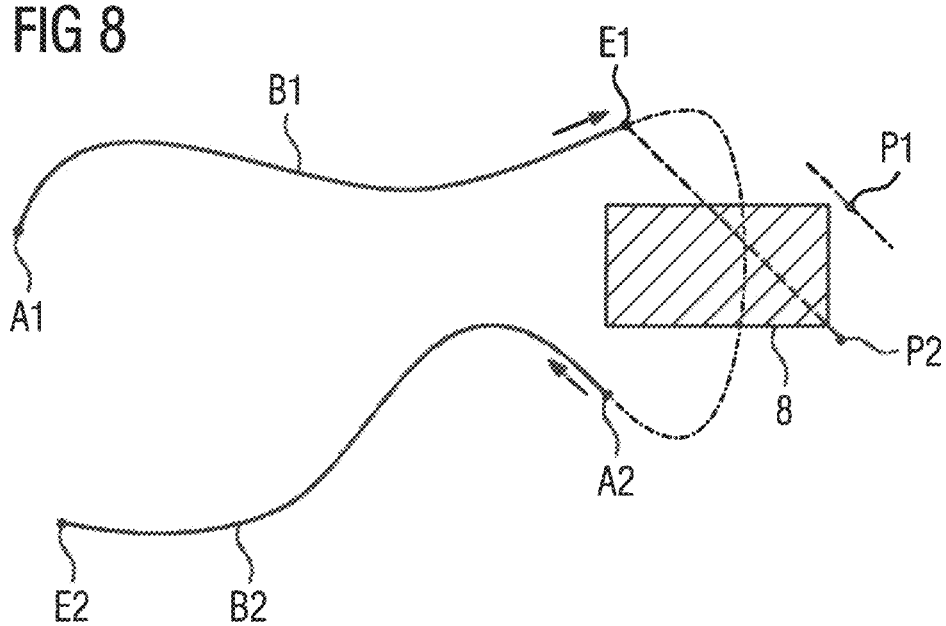
FIG. 8 shows possible path sections and movement guidances.

So far, a procedure has been described in which a movement guidance from the end E1 of a respective path section B1 directly to the beginning A2 of the respective subsequent path section B2 has been determined. FIG. 8 shows such a movement guidance. In many cases, this movement guidance can be utilized without problems. In many cases, however, a permissible region in the space defined by the possible movement ranges of the axes 1, within which the movement guidance determined by the control facility must take place, is known to the control facility 4. Expressed differently: there is conversely a forbidden region 8—see FIG. 8—in which the movement guidance must not take place. It is possible, that the permissible region is specified as such directly to the control facility 4. Alternatively, it is conversely possible that the forbidden region 8 is specified to the control facility 4, so that the control facility 4 can determine the permissible region indirectly. In order also to be able to determine a proper movement guidance in such a case, the control facility 4 proceeds as described below in relation to FIG. 9.

Figure 9:
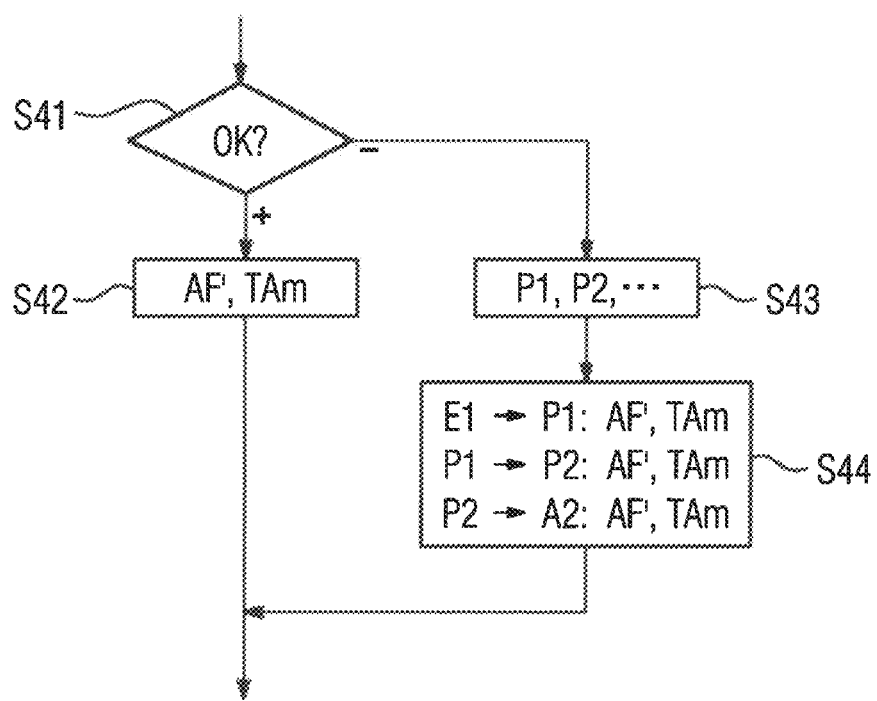
FIG. 9 shows a flow diagram for determining a plurality of submovements.

In accordance with FIG. 9, the control facility 4 tests in step S41 whether a movement guidance based exclusively upon the end E1 of a respective path section B1 and the beginning A2 of the respective directly subsequent path section B2 would take place within the permissible region. If this is the case, the control facility 4 determines in step S42—just as described in relation to FIG. 1 to 7—the movement guidance of the first element 2 relative to the second element 3. It is also possible, however, that the control facility 4 ascertains in step S41 that the movement guidance determined by it would encroach upon the forbidden region 8. An example of such a forbidden movement guidance is shown dot-dashed in FIG. 8. If the movement guidance encroaches upon the forbidden region, the control facility 4 subdivides the movement guidance in a step S43 into a plurality of directly successive submovements. In particular, in step S43, the control facility 4 defines intermediate points P1, P2 which must be visited in the course of the movement guidance still to be determined. The control facility 4 thereby subdivides the movement guidance into a plurality of submovements. The submovements follow one another directly, for example, from the end E1 of one path section B1 to the first intermediate point P1, from there to the second intermediate point P2 and from there to the beginning A2 of the subsequent path section B2. The corresponding determination of the intermediate points P1, P2, etc. is commonly known to persons skilled in the art. It is used, in particular, for collision prevention.

If the control facility 4 determines such intermediate points P1, P2, etc., the control facility 4 carries out the procedure described above in relation to the respective submovement. Thus, in step S44, according to the procedure described above, it determines a movement guidance for each submovement from the end E1 of one path section B1 to the first intermediate point P1, a movement guidance for the submovement from the first intermediate point P1 to the second intermediate point P2 and a movement guidance for the submovement from the second intermediate point P2 to the beginning A2 of the subsequent path section B2. The determination takes place in each case as if the submovements were each a separate movement guidance. As a result of the manner of the determination (as described above), the submovements are each per se continuous in location x, velocity v and acceleration a and limited in velocity v, acceleration a and jerk r. Furthermore, one path section B1 transitions continuously in location x, velocity v and acceleration a into the initially performed submovement and the last performed submovement transitions continuously in location x, velocity v and acceleration a into the respective subsequent path section B2. The transitions from a submovement to the subsequent submovements are also continuous in velocity v and acceleration a.

In order to be able to make use of the present invention to the fullest extent, where possible not only the respective location x should be defined for the intermediate points P1, P2, etc. In addition, at least the respective velocity v and/or acceleration a of at least one of the axes 1 should also have a value other than 0.

A possible procedure lies in determining for each of the intermediate points P1, P2 etc., one direct connection of the two ends of the two adjacent submovements. This is indicated dashed in FIG. 8 for the intermediate point P1. The associated vector can be used for the definition of the velocity at the intermediate point P1. In particular, the direction of the velocity at the intermediate point P1 can extend parallel to this vector. The velocity vector is then scaled such that for at least one axis 1, the velocity v reaches its maximum possible quantitative value vmax and for the other axes 1, the velocity v lies quantitatively below its respective maximum possible value vmax. Alternatively, it is possible to set all velocity components quantitatively to their respective maximum possible value vmax and to specify only the sign on the basis of the vector defined by the direct connection of the two ends of the two adjacent submovements. Other procedures are however also possible.

Summarizing, the present invention therefore relates to the following subject matter:

A machine has a plurality of position-controlled axes 1 which bring about, in their entirety, a displacement movement of two elements 2, 3 of the machine relative to one another. The control facility 4 controls the axes 1 of the machine such that the elements 2, 3 traverse path sections B1 to B3 relative to one another sequentially one after another, each with a velocity profile defined for the respective path section B1 to B3 and an acceleration profile defined thereby. The path sections B1 to B3 each have a beginning A1 to A3 and an end E1 to E3, the end E1 and the beginning A2 of directly subsequent path sections B1, B2 differing in the position of at least one axis 1. The control facility 4 determines for the axes 1 a time-optimal movement guidance that is continuous in location x, velocity v and acceleration a and is limited in velocity v, acceleration a and jerk r, from the end E1 of the first path section to the beginning A2 of the subsequent path section B1, B2. The determination takes place such that the movement of the elements 2, 3 relative to one another at the end E1 of one path section B1 transitions continuously in location x, velocity v and acceleration a into the determined movement guidance and the determined movement guidance at the beginning A2 of the other path section B2 transitions continuously in location x, velocity v and acceleration a into the other path section B2. The control facility 4 determines, as the movement guidance, both the path to be traversed as such and also the associated velocity and acceleration profiles.

The present invention has many advantages. In particular, the duration required for unproductive route sections can be minimized so that the overall processing time is reduced and thereby the efficiency can be increased. This applies equally for all types of unproductive route sections. Taking account of a permissible region (or conversely a forbidden region 8) is possible without difficulty. The method according to the invention is so rapid that it can be carried out online and in real time on the control facility 4. The dynamic limitations of the machine, that is, the maximum possible values vmax, amax, rmax for velocities v, accelerations a and jerks r of the individual axes 1 are also known to the control facility 4. The control program 5 which realizes the operating method according to the invention can be retrofitted without difficulty in an existing control facility 4. An exchange of an existing control facility 4 is not necessary.

Although the invention has been illustrated and described in detail with the preferred exemplary embodiment, the invention is not restricted by the examples disclosed and other variations can be derived therefrom by a person skilled in the art without departing from the protective scope of the invention.

The invention claimed is:

1. A method for operating a machine which has a plurality of position-controlled axes that cause a displacement movement of a first element of the machine relative to a second element of the machine, the method comprising:
   controlling the position-controlled axes such that the first element traverses relative to the second element sequentially a plurality of predetermined path sections with a velocity profile and an acceleration profile defined for each path section, wherein each path section has a beginning and an end, with the end of each path section and the beginning of a directly following path section differing in a position of at least one of the position-controlled axes,
   without knowledge of an actual path to be traversed from the end of the path section to the beginning of the directly following path section, determining for a movement guidance between the end of each path section and the beginning of a directly following path section, independently for each of the axes, initially respective preliminary axis guidances that are coordinated so that the movement guidance is time-optimized and continuous in location, velocity and acceleration and limited in velocity, acceleration and jerk, from the end of the path section to the beginning of the directly following path section,
   determining for each of the axes an individual axis time required for the respective preliminary axis guidances,
   determining from the previously determined individual axis times a greatest required axis time for a specific axis,
   adopting the greatest required axis time as the final axis guidance for the specific axis,
   modifying, for other axes whose axis time is smaller than the greatest required axis time, the preliminary axis guidance so as to maintain continuity in location, velocity and acceleration, by matching the smaller axis times to the greatest required axis time, and
   adopting the modified axis guidances for the other axes as the final axis guidances.

2. The method of claim 1, wherein modifying the preliminary axis guidance comprises decreasing a value of a target velocity for the other axes and, on the basis of the decreased target velocity, determining the respective preliminary axis guidance for the other axes anew, until the associated axis time for the other axes matches the greatest required axis time.

3. The method of claim 1, further comprising, for determining the respective preliminary axis guidance:
   subdividing the respective preliminary axis guidance into seven directly successive phases, with each phase having a non-negative duration;
   setting in the first and seventh phase the jerk to a positive or negative value with a maximum magnitude,
   setting in the second and sixth phase the jerk to zero;
   setting in the third phase the jerk to an inverse value of the jerk in the first phase, and setting in the fifth phase the jerk to an inverse value of the jerk in the seventh phase,
   setting in the fourth phase the jerk and the acceleration to zero,
   setting in the fourth phase the velocity to a target velocity having successively a positive and negative magnitude with a maximum permissible value,
   determining for the target velocity the preliminary axis guidance in the first, second and third phase, so that at the end of the third phase, the acceleration is zero and the velocity is equal to the target velocity,
   determining the preliminary axis guidance in the fifth, sixth and seventh phase, so that at the beginning of the fifth phase the acceleration is zero and the velocity is equal to the target velocity, and
   checking whether, in view of the determined preliminary axis guidance in the first to third phase and in the fifth to seventh phase, a theoretical duration of the fourth phase is greater than or equal to zero,
   in response to that the theoretical duration of the fourth phase is greater than or equal to zero, adopting the respective preliminary axis guidance for the first to third and the fifth to seventh phase, and adopting the determined theoretical duration as an actual duration for the fourth phase,
   in response to that the theoretical duration of the fourth phase is not greater than or equal to zero, setting the determined duration of the fourth phase equal to zero so that the third phase and the fifth phase directly adjoin one another, and furthermore reducing the value of the target velocity and repeating determining the preliminary axis guidance for the first to third phase and for the fifth to seventh phase with the reduced target velocity until either the third and the fifth phase transition into one another continuous in location, velocity and acceleration, or concluding that the preliminary axis guidance cannot be determined for the respective sign of the target velocity.

4. The method of claim 1, further comprising
defining a permissible region in a space spanned by possible movement ranges of the axes in which the movement guidance must take place,
checking whether the movement guidance determined according to claim 1 could take place within the permissible region based exclusively upon the end of a respective path section and the beginning of the respective directly following path section,
in response to that the movement guidance determined according to claim 1 could not take place within the permissible region, subdividing the movement guidance into a plurality of directly successive submovements defined by intermediate points, with the submovements being continuous in location, velocity and acceleration and limited in velocity, acceleration and jerk, wherein the submovements are determined from the beginning of the respective subregion to the end of the respective subregion commensurate with the movement guidance determined according to claim 1.

5. The method of claim 4, wherein for, at least one of the axes, at least one of the submovements has both at the beginning and at the end a nonzero velocity and/or a nonzero acceleration.

6. The method of claim 1, wherein the beginning and the end of the path sections are predefined or are independently determined by a control facility.

7. The method of claim 6, wherein the method is executed online by the control facility.

8. A control program product for a control facility, the control program product comprising a control program embodied on a non-transitory medium and has machine code, which when loaded into a memory of the control facility and executed by a processor of the control facility, causes the control facility to operate a machine which has a plurality of position-controlled axes that cause, in their entirety, a displacement of a first element of the machine relative to a second element of the machine, wherein the control facility is configured to
control the position-controlled axes such that the first element traverses relative to the second element sequentially a plurality of predetermined path sections with a velocity profile and an acceleration profile defined for each path section, wherein each path section has a beginning and an end, with the end of each path section and the beginning of a directly following path section differing in a position of at least one of the position-controlled axes,
without knowledge of an actual path to be traversed from the end of the path section to the beginning of the directly following path section, determine for a movement guidance between the end of each path section and the beginning of a directly following path section, independently for each of the axes, initially respective preliminary axis guidances that are coordinated so that the movement guidance is time-optimized and continuous in location, velocity and acceleration and limited in velocity, acceleration and jerk, from the end of the path section to the beginning of the directly following path section,
determine for each of the axes an individual axis time required for the respective preliminary axis guidances,
determine from the previously determined individual axis times a greatest required axis time for a specific axis,
adopt the greatest required axis time as the final axis guidance for the specific axis,
modify, for other axes whose axis time is smaller than the greatest required axis time, the preliminary axis guidance so as to maintain continuity in location, velocity and acceleration, by matching the smaller axis times to the greatest required axis time, and
adopt the modified axis guidances for the other axes as the final axis guidances.

9. A control facility for a machine, comprising a plurality of position-controlled axes which cause, in their entirety, a displacement movement of a first element of the machine relative to a second element of the machine, wherein the control facility is configured to
control the position-controlled axes such that the first element traverses relative to the second element sequentially a plurality of predetermined path sections with a velocity profile and an acceleration profile defined for each path section, wherein each path section has a beginning and an end, with the end of each path section and the beginning of a directly following path section differing in a position of at least one of the position-controlled axes,
without knowledge of an actual path to be traversed from the end of the path section to the beginning of the directly following path section, determine for a movement guidance between the end of each path section and the beginning of a directly following path section, independently for each of the axes, initially respective preliminary axis guidances that are coordinated so that the movement guidance is time-optimized and continuous in location, velocity and acceleration and limited in velocity, acceleration and jerk, from the end of the path section to the beginning of the directly following path section,
determine for each of the axes an individual axis time required for the respective omliminary axis guidances,
determine from the previously determined individual axis times a greatest required axis time for a specific axis,
adopt the greatest required axis time as the final axis guidance for the specific axis,
modify, for other axes whose axis time is smaller than the greatest required axis time, the preliminary axis guidance so as to maintain continuity in location, velocity and acceleration, by matching the smaller axis times to the greatest required axis time, and
adopt the modified axis guidances for the other axes as the final axis guidances.

10. A machine, comprising
a plurality of position-controlled axes which cause, in their entirety, a displacement movement of a first element of the machine relative to a second element of the machine,
a control facility as set forth in claim 9 for controlling the machine.

* * * * *